(12) United States Patent
Fecioru et al.

(10) Patent No.: US 11,461,277 B2
(45) Date of Patent: Oct. 4, 2022

(54) SELF-SERVICE SYSTEM FOR MANAGING SHARED RESOURCES

(71) Applicant: ADOBE INC., San Jose, CA (US)

(72) Inventors: Andrei Fecioru, Bucharest (RO); Claudiu-Costinel Ciudatu, Bucharest (RO); Adrian Tanase, Mogosoaia (RO)

(73) Assignee: Adobe, Inc., San Jose, CA (US)

( * ) Notice: Subject to any disclaimer, the term of this patent is extended or adjusted under 35 U.S.C. 154(b) by 1404 days.

(21) Appl. No.: 15/220,169

(22) Filed: Jul. 26, 2016

(65) Prior Publication Data
US 2018/0032543 A1    Feb. 1, 2018

(51) Int. Cl.
*G06F 16/176*    (2019.01)
*G06F 16/2455*   (2019.01)

(52) U.S. Cl.
CPC ...... *G06F 16/176* (2019.01); *G06F 16/24568* (2019.01)

(58) Field of Classification Search
CPC ......... G06F 17/30165; G06F 17/30516; G06F 16/176; G06F 16/24568
See application file for complete search history.

(56) References Cited

U.S. PATENT DOCUMENTS

| | | | | |
|---|---|---|---|---|
| 2006/0106859 A1* | 5/2006 | Eugene | ............... | G06Q 10/10 |
| 2009/0276771 A1* | 11/2009 | Nickolov | ........... | H04L 67/1014 |
| | | | | 717/177 |
| 2011/0179422 A1* | 7/2011 | Stegaru | ................. | G06F 9/5011 |
| | | | | 718/104 |
| 2013/0061135 A1* | 3/2013 | Reinders | ............. | G06F 16/5838 |
| | | | | 715/255 |
| 2016/0034308 A1* | 2/2016 | Kishan | .................. | G06F 9/5011 |
| | | | | 718/104 |
| 2016/0277708 A1* | 9/2016 | Rintel | .................... | H04N 7/142 |
| 2016/0342987 A1* | 11/2016 | Thomas | ................. | G06Q 40/00 |
| 2017/0142741 A1* | 5/2017 | Kaur | ..................... | H04W 76/18 |

OTHER PUBLICATIONS

Emma Jane Hogbin Westby, "Git for Teams A user-centered approach to creating efficient workflows in GIT", Aug. 17, 2015.*
Emma Jane Hogbin Westby, "Git for Teams A user-centered approach to creating efficient workflows in GIT", Aug. 17, 2015 (Year: 2015).*

* cited by examiner

*Primary Examiner* — William B Partridge
*Assistant Examiner* — Aryan D Toughiry
(74) *Attorney, Agent, or Firm* — Shook, Hardy & Bacon L.L.P.

(57) ABSTRACT

The self-service resource management system includes a resource auditor to audit version information and state information of resources contributed by users. Further, a resource broker in the resource management system is configured to facilitate a formation of a resource pool of shared resources when each of the required resources in the resource pool reached a published state. Subsequently, a resource distributor in the resource management system is configured to form a workflow to distribute respective versions of the resources published to the resource pool. As such, the self-service resource management system can enable users to share and receive resources negotiated by users.

20 Claims, 7 Drawing Sheets

SELF-SERVICE SYSTEM FOR MANAGING SHARED RESOURCES

BACKGROUND

Data sharing is making data owned by one party available to another party. In the absence of intellectual property issues, data sharing is fundamental from scientific researches (e.g., research collaboration, scientific publications, etc.) to daily life (e.g., file sharing, music sharing, etc.). Often, data sharing must be carefully controlled both in terms of how data is being shared (i.e., policies or rules for data sharing) as well as what is being shared down to the level of individual data points (i.e., content for data sharing).

Generally, the activation of a shared data stream between a sharer and a receiver is predicated on both parties simultaneously agreeing on what is being shared and how to share. A service provider for data sharing is often used as a gatekeeper, which restricts or permits data access based on a set of predefined access rules. Usually, it is a convoluted and lengthy process for the service provider to facilitate the involved parties to simultaneously reach consensus on the set of access policies or rules as well as the details of the shared data before any actual data sharing can occur.

SUMMARY

Embodiments of the present invention relate to systems and methods for managing shared resources. As such, embodiments of the present disclosure relate to a self-service system and related processes for managing shared resources, e.g., data. As described in embodiments herein, technical solutions are provided to automatically enable workflows for sharing resources after a group of users reach consensus on a set of versioned resources. This process takes place automatically without the intervention of the entities implementing such workflows for sharing resources. Further, when one of the involved parties suspends a particular resource, the resource sharing management system automatically disables any workflow predicated on the availability of the particular resource.

To enable data sharing, this self-service system records information of draft versions of the involved resources, so that the participating users can inspect all the changes made to each resource and provide feedback to their respective owners. This preparation phase occurs prior to the resources actually being shared. Subsequently, this self-service system forms a resource pool when all required resources in the resource pool are published by participating data owners. In other words, the participating data owners can self-service themselves to reach consensus on the content and manner in which data is being shared while benefiting from the built-in full audit support of the resource management system.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments will be readily understood by the following detailed description in conjunction with the accompanying drawings.

DETAILED DESCRIPTION

Figure 1:
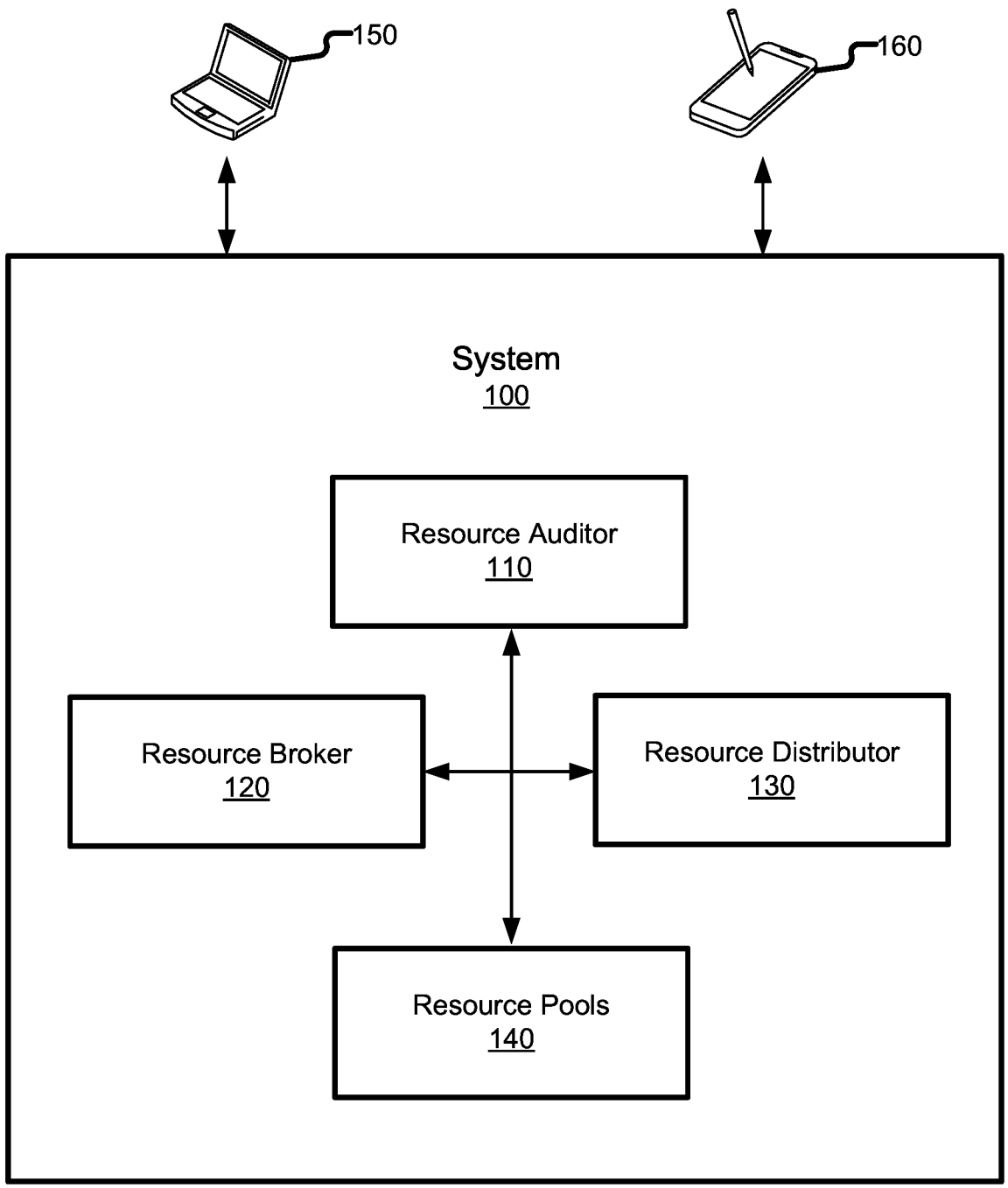
FIG. 1 is a schematic diagram illustrating an example implementation of a resource management system, incorporating aspects of the present disclosure, in accordance with various embodiments.

Various terms are used throughout this description. Definitions of some terms are included below to provide a clearer understanding of the ideas disclosed herein.

The term "resource" refers to information, knowledge, or data that is represented in a form suitable for further processing. Resources, as referred to herein, include data (e.g., a set of values of qualitative or quantitative variables) suitable for sharing among a group of users. Resources include unprocessed raw data as well as processed data that is derived from the raw data. By way of example, resources include experimental data, observation data, analysis of data, documents, images, videos, database tables, database schemas, programs, machine code, etc.

The term "resource pool" refers to a collection of resources. The required resources in a resource pool are generally determined by a group of users for a data sharing project. By way of example, SETI@home is a scientific experiment that uses Internet-connected computers in the Search for Extraterrestrial Intelligence (SETI). In this case, a group of users can contribute their analyzed radio telescope data into a resource pool for sharing and further analysis.

The term "state" refers to a property of a resource or a resource pool in relation with its availability as dictated by the sharing process. The state at any given time is called the current state for the resource or the resource pool. The current state can change from one state to another in a transition when triggered by an event or condition. In various embodiments, a resource management system recognizes at least one state of DRAFT, PUBLISHED, or SUSPENDED for a resource. Similarly, the resource management system recognizes at least one state of ACTIVE and INACTIVE for a resource pool.

A user can make many different versions of a resource in the state of DRAFT. The user can change the state of the resource from DRAFT to PUBLISHED. A resource in the state of PUBLISHED is eligible to be included in a resource pool. A resource pool is formed when every required resource is transited into a state of PUBLISHED. Accordingly, the state of the resource pool becomes ACTIVE. Hence, by definition, an ACTIVE resource pool contains only resources in the PUBLISHED state. On the other hand, the user can withdraw the resource by changing its state to SUSPENDED. When that happens, the state of the resource pool will change to INACTIVE. By definition, an INACTIVE resource pool contains at least one resource in the SUSPENDED state.

The term "data distribution specification" refers to the mechanisms of data sharing. A data distribution specification specifies the data, metadata of the data (e.g., validity, formation, etc.), and the sharing mechanisms of the data. By way of example, a data distribution specification specifies the frequency and routing mechanisms for sending data from one user to another.

The term "workflow" refers to the implementation of a data distribution specification. Once a resource pool is activated, the downstream workflow for implementing the corresponding data distribution specification is also activated. By the same token, once the resource pool is deactivated, the downstream workflow for implementing the corresponding data distribution specification is also deactivated.

Back to data sharing, it is a cumbersome process in the current state of affairs for managing both the actual contents of the data being shared as well as the associated workflows. By way of example, to enable involved parties to share video analytical data, a third party has to play the role of a broker between the interested parties. The broker receives a specification for the sharing rules and a list of data points to be shared from the data sharing party, e.g., usually via email with document attachments. In turn, the broker has to forward the same documents to the receiving party for their feedback. In this way, the broker has to send these specifications of data sharing back and forth and mediate the whole negotiation/validation process until an agreement is reached.

This process sometimes takes weeks or even months to reach a finalized data sharing specification (a.k.a. data stream specification) for two parties. Based on this data stream specification, the broker can then implement a back-end downstream workflow for routing the corresponding analytics data to the appropriate destinations. When multiple parties are involved, the complexity of this negotiation process grows exponentially.

Besides the overhead, one of the major disadvantages of the current system is the lack of built-in audit capabilities. Except for knowing an agreement for data sharing has been reached, there is no track record of what decisions were made by each party to reach the final agreement.

In this disclosure, technical solutions are provided to manage shared resources for a group of users. To this end, embodiments of the present disclosure include a self-service resource management system and related processes for sharing resources. As described in reference to illustrative embodiments, when a group of users reach consensus on a set of versioned resources, the resource management system automatically forms a resource pool with the set of versioned resources and enables a workflow for sharing the resources in the resource pool. Further, when a user suspends a resource in the resource pool, the resource management system automatically deactivates the resource pool and disables the workflow for sharing the resources.

This self-service resource management system allows multiple users to collaborate and share a set of resources after reaching an agreement on the contents of these resources and unlocking downstream processing workflows for data sharing. This self-service resource management system enables participating users in a data sharing project to create multiple draft versions of the resources they own. One purpose of these draft versions is to support collaboration between users and to speed up the process of reaching consensus because each user can view and provide feedback on the draft versions of resources managed by other users.

This self-service resource management system enables participating users to publish any specific versions of their resources, e.g., by changing the state of a resource from DRAFT to PUBLISHED. Once a resource has reached the published state, the resource becomes eligible to be included in a resource pool, which includes a set of resources required by a group of participating users for data sharing. Once all the resources required by the group of participating users reach the published state, the self-service resource management system formally forms the resource pool. Therefore, a resource pool comprises a composition of a set of versioned resources, and the formation of the resource pool takes place automatically without the intervention of the involved parties. Subsequently, the formation of a resource pool actuates any downstream workflows to share all resources predicated on the resource pool.

Further, the self-service resource management system also supports a user to deactivate a resource pool, e.g., by suspending a resource in the resource pool. In various embodiments, a single resource can be part of multiple resource pools. In one embodiment, all resource pools involving the suspended resource are marked as INACTIVE, and the associated downstream workflows for data sharing are disabled.

The resource management system records and properly attributes all operations related to resources, resource pools, and workflows for data sharing so that the resource management system can support full auditing capabilities. The resource management system also enables its self-service capabilities, e.g., based on its auditing capabilities. Users can self-service the formation of a resource pool as well as deactivate the resource pool because users can directly collaborate on draft versions of the various resources and can promote these resources to the state of PUBLISHED.

Additionally, the ability to allow all participating users to review, collaborate, and provide feedback on draft versions of resources also eliminates the traditional needs of a broker to mediate the process for data sharing. In the disclosed self-service resource management system, no intervention from a traditional broker is required. Downstream workflows predicated on a resource pool are automatically enabled once the resource pool is formed, and the formation of the resource pools is also automatic, e.g., predicated on all required resources reaching the PUBLISHED state. On the other hand, these downstream workflows predicated on the resource pool are automatically disabled, e.g., after a user suspends a resource in the resource pool.

Referring now to FIG. 1, a schematic diagram illustrates an example implementation of a resource management system 100 in accordance with various embodiments. System 100 enables users to collaborate and reach consensus for data sharing via a user device, e.g., computer 150 or mobile device 160. A user can draft multiple versions of a resource, e.g., with different configurations. Resource management system 100 gives the full visibility of draft versions of the involved resources to all participating users in a data sharing project. Further, users are empowered to enable or disable downstream workflows predicated on their shared resources. These processes take place automatically without the intervention of the entities implementing the downstream workflows.

As illustrated in FIG. 1, resource management system 100 includes resource auditor 110, resource broker 120, resource distributor 130, and resource pools 140, operatively coupled with each other. In some embodiments, resource management system 100 is a server computing device and/or service, such as a server and/or a service provided in a computing cloud, and interacts with user computing devices (e.g., computer 150 and mobile device 160). In alternative embodiments, system 100 can be integrated with a user computing device, such as computer 150 and mobile device 160, or any other type of user device.

In some embodiments, resource management system 100 is embodied as a specialized computing device. In some embodiments, resource management system 100 can be embodied, for example, as an application or a mobile app. In some embodiments, resource management system 100 can be a distributed system, for example, each of resource auditor 110, resource broker 120, resource distributor 130, and resource pools 140 can be distributed across any number of servers. Regardless of the computing platform on which resource management system 100 is implemented, resource management system 100 can be embodied as a hardware component, a software component, or any combination thereof for managing shared resources.

Resource management system 100 utilizes resource broker 120 to form shared resource pools. A resource pool includes a set of resources required by a group of participating users for data sharing. Resource broker 120 allows multiple users in a data sharing project to collaboratively form a resource pool. This can be accomplished by first enabling participating users in the data sharing project to draft multiple draft versions of the resources they own. Further, resource broker 120 enables these participating users to view and provide feedback on the draft versions of resources owned by each other. In this way, participating users can quickly move forward to consensuses of a pool of shared resources and unlocking downstream workflows for data sharing.

Resource broker 120 forms a resource pool when all the resources required by a data sharing project reach the PUBLISHED state. A user can create multiple versions of the same resource. Therefore, the user can publish different versions of the resource to different data sharing projects, eventually to different shared resource pools. Each resource pool will include a set of versioned resources with respective versions when they are published.

In one embodiment, resource broker 120 sets up a tentative resource pool for a data sharing project, and determines what resources are required by participating users in the data sharing project. Users may add or remove resources from the tentative resource pool. Users can edit the resources that they contributed to the tentative resource pool, e.g., by creating new versions of the resources. A new version of a resource will have a default state of DRAFT. However, resource broker 120 enables a user to change the state of a resource from DRAFT to PUBLISHED. Once a resource reaches the PUBLISHED state, the resource becomes a candidate to the official resource pool for the data sharing project. A consensus of data sharing for all participating users is reached when all required resources reach the PUBLISHED state. At this point, resource broker 120 will formally create the resource pool for the data sharing project, and set the state of the resource pool to be ACTIVE.

Thereafter, resource management system 100 utilizes resource distributor 130 to activate relevant workflows to distribute the resources in the resource pool for the data sharing project. In some embodiments, resource distributor 130 determines the relevant workflows to distribute the resources based on the data stream specification specified in the published resources. By way of example, users can specify what data to share and how the data should be shared for each resource, e.g., in Extensible Markup Language (XML), JavaScript Object Notation (JSON), or any other structured formats that allow human-readable and/or machine-readable specification of attribute—value pairs. Accordingly, resource distributor 130 determines relevant workflows to distribute the resources to appropriate receivers in appropriate time and frequency based on such data stream specification.

In various embodiments, resource distributor 130 distributes the resources via, e.g., internal busses or one or more wireless and/or wired networks. The internal busses include an internal data bus, memory bus, system bus, or Front-Side-Bus, which connects all the internal components of a computing device. Wireless or wired networks include public and/or private networks, such as, but not limited to, local area networks (LANs), wide area networks (WANs), the Internet, or any combination thereof. In some embodiments, these wireless networks include one or more wireless personal area networks (WPANs), wireless local area networks (WLANs), wireless metropolitan area networks (WMANs), or wireless wide area networks (WWANs). In some embodiments, these wireless networks include cellular networks, for example, Wideband Code Division Multiple Access (WCDMA), Global System for Mobile Communications (GSM), Long Term Evolution (LTE), and the like. It will be appreciated that any combination of the above discussed networks can be utilized without departing from the scope of this disclosure. In addition, the above discussed networks are merely meant to be illustrative in nature. The manner in which resource management system 100 distributes shared resources should not be viewed as limiting of this disclosure.

On the other hand, resource management system 100 also allows a user to suspend resources owned by the user. By way of example, resource broker 120 enables a user to change the state of a resource from PUBLISHED to SUSPENDED. When a resource is suspended, resource broker 120 will deactivate the resource pool including the suspended resource. In some embodiments, resource broker 120 deactivates all resource pools which include the suspended resource. In other embodiments, resource broker 120 deactivates only resource pools with the specific version of the suspended resources, therefore mitigating the impact to other resource pools with different versions of the same resource. Further, resource broker 120 still allows the user to edit the resource and republish the resources. In that case, resource broker 120 notifies relevant users and facilitates formations of new resource pools, e.g., as illustrated in connection with FIG. 5.

In various embodiments, resource auditor 110 records and properly attributes all operations related to resources, resource pools, workflows for data sharing, etc. As an example, resource auditor 110 records and attributes each version of a resource created by a user. As another example, resource auditor 110 records and attributes each resource pool, including, e.g., not only the set of resources finally published to a resource pool, but also the ownership of those resources and the negotiation process related to those resources. As yet another example, resource auditor 110 records and attributes each workflow for distributing shared data, e.g., the data stream specification for a workflow and the data sharing log.

Resource pools 140 includes various resource pools in ACTIVE states with active workflows for data sharing, but resource pools 140 also includes various resource pools in DEACTIVATED states, e.g., after an active resource pool gets deactivated in response to a suspended resource in the resource pool. The relationship among users, resources, and resource pools is illustrated further in FIG. 2.

In other embodiments, resource management system 100 can be implemented differently than that depicted in FIG. 1. As an example, resource distributor 130 can be combined with resource broker 120 to form a comprehensive resource management component to manage data sharing and distribution. In some embodiments, components depicted in FIG. 1 have a direct or indirect connection not shown in FIG. 1. In some embodiments, some of the components depicted in FIG. 1 are divided into multiple components. As an example, resource broker 120 can be divided into separate components, e.g., one component responsible for the formation of resource pools and another component responsible for the deactivation of resource pools. Further, one or more components of resource management system 100 can be located across any number of different devices and/or networks. As an example, resource pools 140 can be implemented as an independent component in a data server.

Figure 2:
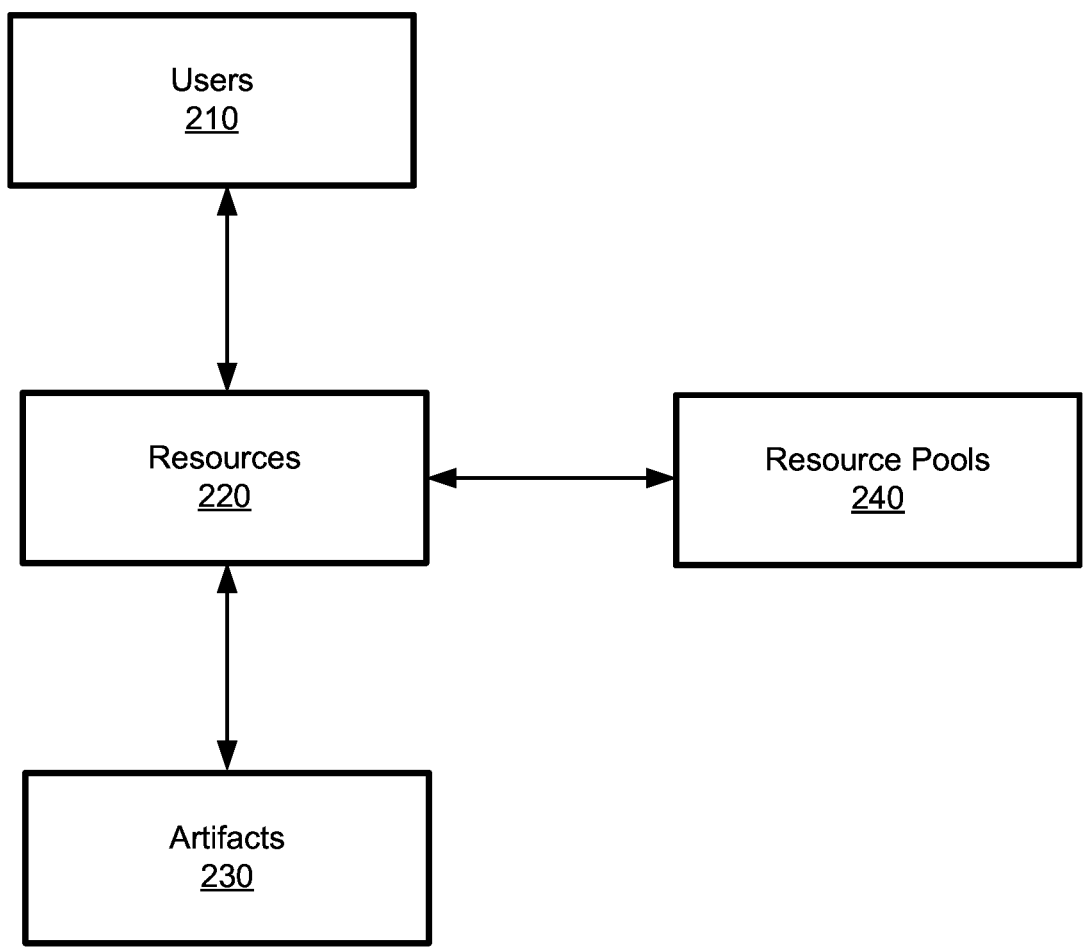
FIG. 2 is an entity-relationship diagram illustrating an example resource pool, incorporating aspects of the present disclosure, in accordance with various embodiments.

FIG. 2 is an entity-relationship diagram 200 illustrating various entity-relationships related to example resource pools 240, incorporating aspects of the present disclosure, in accordance with various embodiments. In various embodiments, users 210 represent two or more parties who are involved in data sharing projects. Hence, one user may be associated with different data sharing projects. Similarly, one user may be associated with various different resources.

Resources 220 include various resources contributed by users 210 to various data sharing projects. A resource in resources 220 may be embodied in different versions. Different versions of the same resource may comprise different artifacts from artifacts 230. A specific version of the resource consists of a set of digital artifacts and a unique version number. Each resource in resources 220 has its version information and state information. The version information includes the unique version number as well as the specification of the set of digital artifacts associated with the unique version number. The state information includes at least one state of DRAFT, PUBLISHED, or SUSPENDED, which is further illustrated in connection with FIG. 3. A resource is associated with one or more artifacts.

Artifacts 230 include the shared data and its specification. By way of example, shared data includes plain documents, images, videos, database tables, database schemas, machine code, etc. The specification of the shared data includes the metadata to describe the shared data, such as the validity information of the data, the format information of the data, the sharing mechanisms of the data, etc.

Resource pools 240 include various resource pools formed to facilitate data sharing. A resource pool will include at least two resources from different users for sharing. Further, a resource pool has at least one state of ACTIVE or INACTIVE. When the resource pool has a state of ACTIVE, the downstream workflows for data sharing are also activated. Vice versa, when the resource pool has a state of INACTIVE, the downstream workflows for data sharing are also deactivated.

Figure 3:
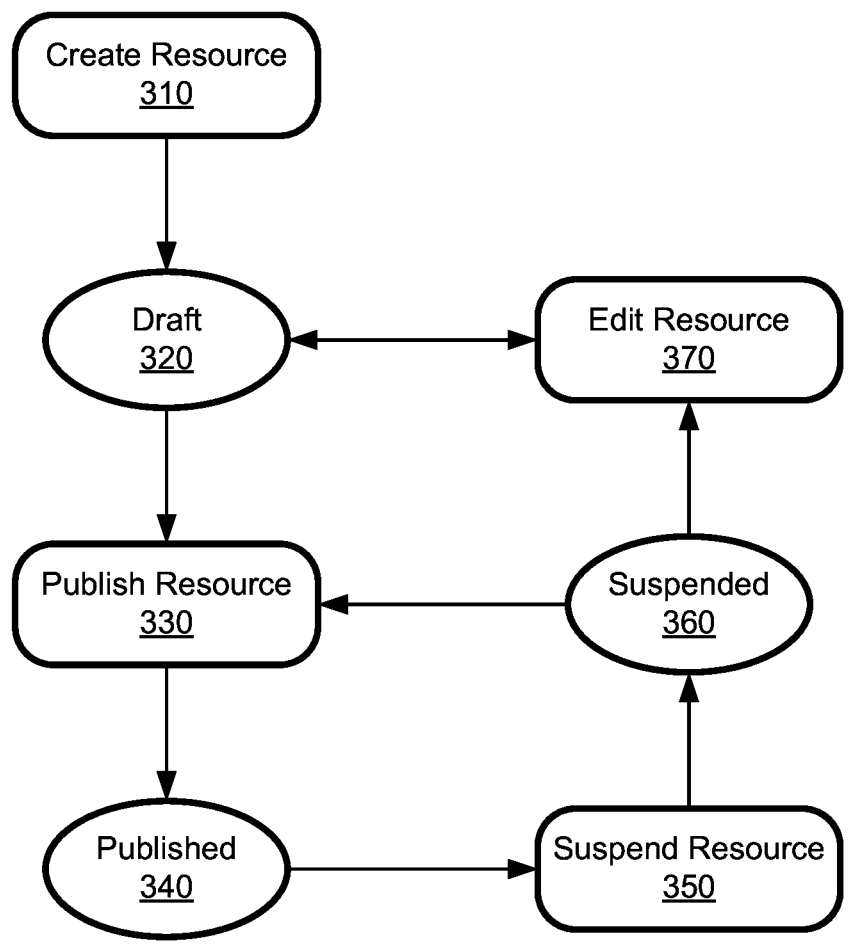
FIG. 3 is a schematic diagram illustrating an example life cycle of resources, incorporating aspects of the present disclosure, in accordance with various embodiments.

FIG. 3 is a schematic diagram illustrating an example life cycle 300 of a resource, incorporating aspects of the present disclosure, in accordance with various embodiments. In some embodiments, each resource has a life cycle defined by its state attribute which can take one of the following values, such as DRAFT, PUBLISHED, or SUSPENDED. In other embodiments, different versions of the same resource have their own life cycles. In other words, different versions of the resource may develop into different states, such as one version is published, but another version is still under draft.

In block 310, a resource is created by a user. In connection with FIG. 2, the resource has a version number and one or more artifacts. The resource will enter its default state of Draft 320. In some embodiments, a user creates the resource from scratch by contributing a set of artifacts to the resource and specifying relevant information of the resource, such as the targeted data sharing project. In some embodiments, a user simply duplicates the resource from another existing resource, and/or subsequently modifies the resource for the needs of the targeted data sharing project.

In block 330, the user publishes the resource. This can be accomplished by changing the state associated with the present version of the resource from Draft 320 to Published 340. Thereafter, the state information of the resource changes to be Published 340, and the resource becomes a part of a resource pool for data sharing. Once all the resources required by the group of participating users reach the published state, the resource pool will be activated.

The resource pool represents an association between a set of specific published versions of resources provided by all the users involved in the data sharing project. A resource pool itself can be in one of two states, e.g., ACTIVE or INACTIVE. The transition between these two states is directly linked to the transition of the associated resources to or from the PUBLISHED state. For example, when all resources switch to the PUBLISHED state, a new resource pool is created to link all published versions of each resource involved in the present data sharing project. In one embodiment, the latest published versions of the resources are used for the newly minted resource pool. In alternative embodiments, users determine the specific versions of resources to be involved in the resource pool. In various embodiments, a resource pool is marked as INACTIVE when any of the associated resources in the resource pool transition from the PUBLISHED state to the SUSPENDED state.

In block 350, the user suspends the resource. This can be accomplished by changing the state associated with the resource from Published 340 to Suspended 360. Thereafter, the state information of the resource changes to be Suspended 360, and the resource pool also is deactivated. In some embodiments, all resource pools involving this suspended resource will be deactivated. In some embodiments, resource suspension is based on a specific version of the resource, so that only resource pools involving the specific version of the resource are to be deactivated, and other resource pools involving different versions of the same resource are to be kept alive. Further, once a resource pool becomes INACTIVE, the associated downstream workflows for data sharing also will be disabled.

In block 370, the user edits the resource. If the present state of the resource is suspended, editing the resource will reset the state of the resource back to Draft 320. In other embodiments, the present state of the resource is Draft 320 already, such as in the process of multiple iterations of editing in creating new versions of the resource, then editing the resource will keep the state of the resource in Draft 320.

The life cycle of the resource can continue. By way of example, the user can publish the resource again to the same or a different data sharing project. In that case, all involved users will renegotiate and form a new resource pool if a consensus is reached again.

Figure 4:
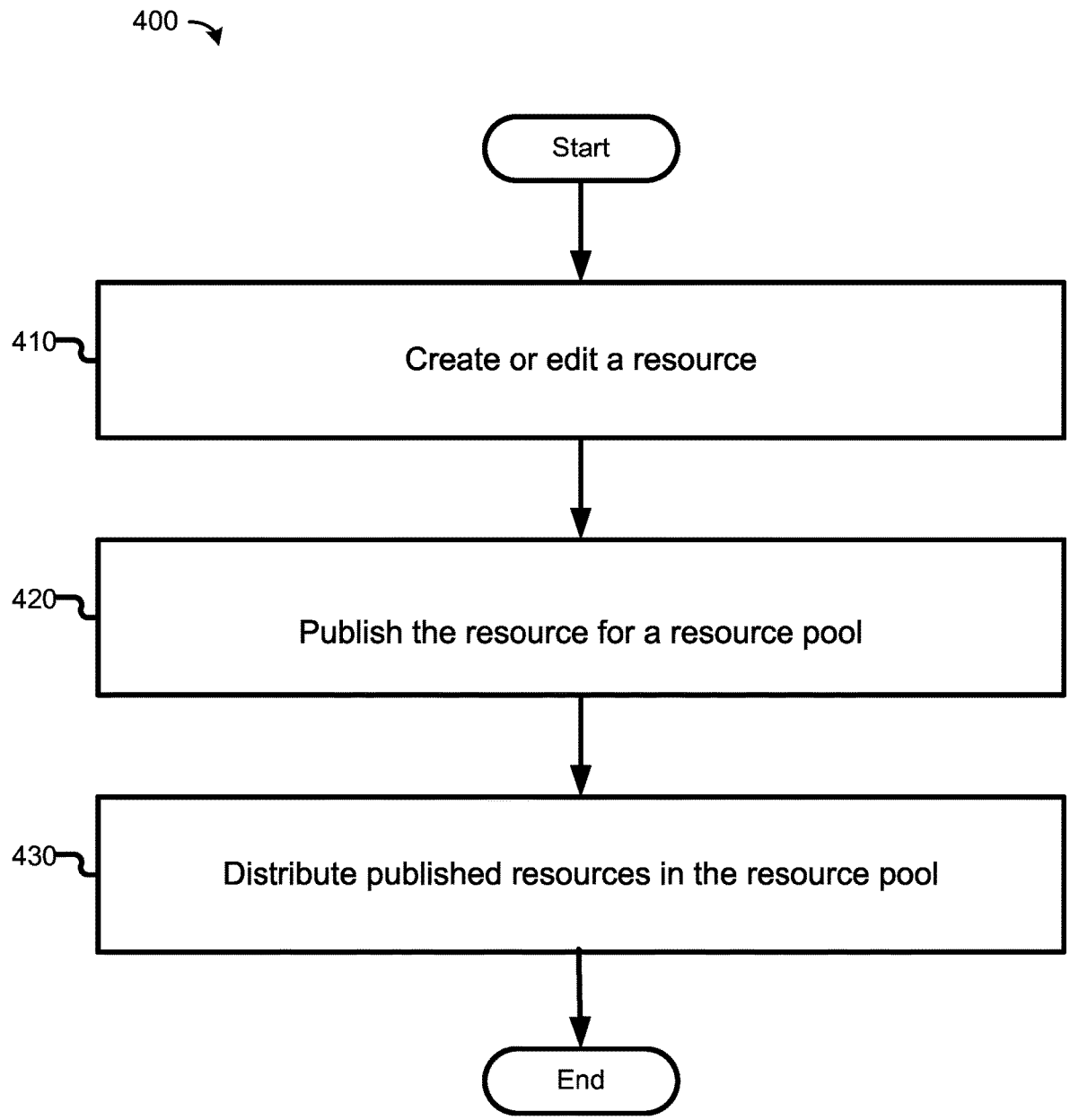
FIG. 4 is a flow diagram of an example process for managing resources, incorporating aspects of the present disclosure, in accordance with various embodiments.

FIG. 4 is a diagram of an example process 400 for managing resources, in accordance with various embodiments of the present disclosure. Process 400 can be performed, for example, by resource management system 100.

Process 400 can be performed by processing logic that comprises hardware (e.g., circuitry, dedicated logic, programmable logic, microcode, etc.), software (e.g., instructions run on a processing device to perform hardware simulation), or a combination thereof. The processing logic can be configured to manage shared resources, such as for a data sharing project.

It will be appreciated that process 400 is not limited to two users. Rather, process 400 enables an arbitrary number of involved users in forming a resource pool and activates resource sharing thereafter. It will also be appreciated that, in various embodiments, process 400 can have fewer or additional operations than those depicted, or perform some of the depicted operations in a different order without departing from the scope of this disclosure.

In various embodiments, the process begins at block 410, where a user creates or edits a resource, e.g., enabled by resource broker 120 of FIG. 1. In one embodiment, a user can determine and specify a set of artifacts to be included in the resource. Further, the user can attribute the resource to one or more data sharing projects. Even further, the user can add, remove, or edit the artifacts in the resource, e.g., catering to the unique needs of a particular data sharing project.

The initial state of a resource is DRAFT. Multiple draft versions can be created, and relevant users can inspect and provide feedback on the resource, e.g., commenting on a particular artifact in the resource, or requesting the user to adjust the particular artifact. While the resource remains in the state of DRAFT, the resource is not committed to any resource pools.

However, users involved in a data sharing project are allowed to review all resources required for the data sharing project regardless of the ownership of those required resources. While participants can view all the resources that are part of a sharing project, only the resource owner can make modifications. In this way, a user may determine whether to publish a resource based on the review of all required resources. A resource may go through multiple draft versions before being published. The resource management system will provide notifications to relevant users and keep all users informed about the changes being made to relevant resources. Such visibility to all users of the overall status of all required resources in a data sharing project expedites a self-service process for these users to reach a consensus of resource sharing.

At block 420, the user publishes the resource, e.g., enabled by resource broker 120 of FIG. 1. To officially form a resource pool, each involved user is required to explicitly publish one version of each resource contributed by the user. Once a resource is published, it becomes eligible to be included in the targeted resource pool. It is expected for a resource to go through several DRAFT states before being finally PUBLISHED. All drafting activities can take place without affecting any existing versions of resources because the publication is directed to a specific version of the resource.

In one embodiment, a user is allowed to publish only the latest version of the resource. In alternative embodiments, the user is allowed to publish any version of the resource. In various embodiments, publishing a resource is accomplished by simply changing the state of the particular version of the resource to PUBLISHED, which sends an indication to the resource management system that the resource is available to be included in a resource pool. Further, distinct versions of the same resource can be linked to different resource pools.

Once all required resources in the data sharing project are published by their respective owners, the resource management system automatically links these published resources into the resource pool, which further activates the resource pool, including the downstream workflows to share these published resources.

In some embodiments, a resource pool is immutable. A resource pool is directed to specific published versions of resources, and the validity of this unique combination of these specific published versions of resources is not affected by subsequent changes made to these resources in question. In other words, when a set of specific versions of resources are linked in a resource pool, they will remain unchanged for the entire life cycle of the resource pool. In one embodiment, a resource pool has a perpetual life. That means that the resource management system does not delete any resource pools, but will only mark a resource pool as INACTIVE. As further discussed in connection with FIG. 5, when a resource is suspended and republished, a new negotiation process is required, so is a new resource pool, for further resource sharing proceedings.

Next, at block 430, the published resources in the resource pool are distributed to appropriate users, e.g., enabled by resource distributor 130. In various embodiments, resource distributor 130 determines the appropriate workflows to distribute the resources based on the data stream specification specified in the published resources. By way of example, each resource may specify when and how its involved artifacts should be distributed. Further, each artifact in the resource may further specify the distribution details of itself. Even further, distribution preferences may be defined at the user level, e.g., a particular user may have a set of policies or rules for distributing resources owned by the user.

In various embodiments, when a resource pool is activated, resource distributor 130 will also activate the downstream workflows for resource distribution. Similarly, when a resource pool changes its state to INACTIVE, resource distributor 130 will also disable the downstream workflows for resource distribution. Meanwhile, all operations related to resources, resource pools, workflows for data sharing, etc., are properly recorded and attributed in the resource management system for auditing.

Figure 5:
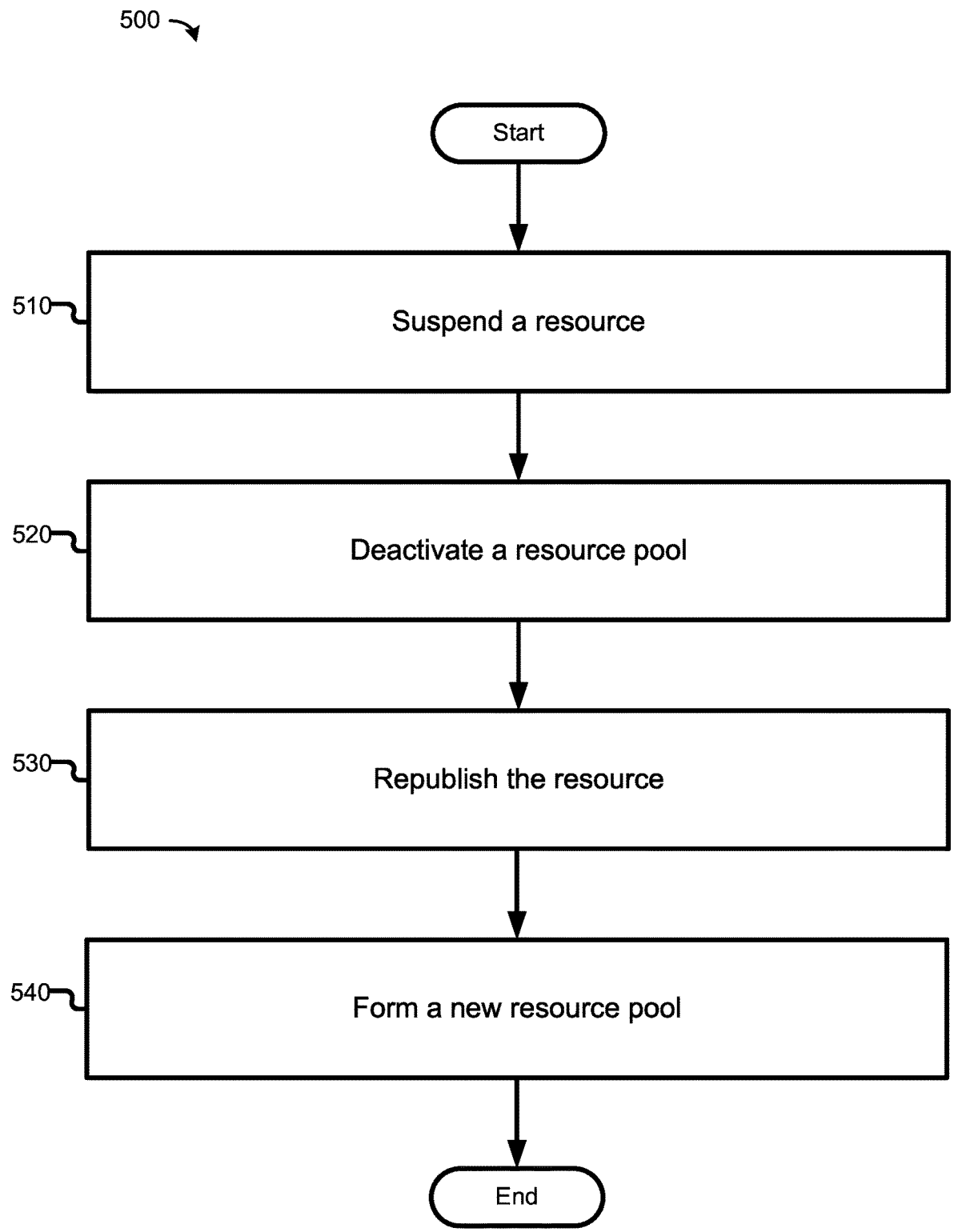
FIG. 5 is a flow diagram of an example process for renegotiating a new resource pool, incorporating aspects of the present disclosure, in accordance with various embodiments.

Referring now to FIG. 5, a flow diagram of an example process 500 for renegotiating a new resource pool, which is to be practiced by an example resource management system in accordance with various embodiments, is provided. As shown, process 500 is to be performed by resource management system 100 of FIG. 1 to implement one or more embodiments of the present disclosure. Similar to process 400, in various embodiments, process 500 may have fewer or additional operations, or perform some of the operations in different orders.

In some embodiments, as discussed herein, a user is permitted to suspend an existing resource even if multiple versions of the resource have been committed to multiple different resource pools. In that case, resource management system 100 of FIG. 1 can facilitate the user to renegotiate with other involved parties to form new resource pools based on the amended and republished resource, e.g., the latest new version of the resource. This renegotiation can be accomplished in process 500.

At block 510, a user suspends a resource owned by the user, e.g., enabled by resource broker 120 of FIG. 1. This can be accomplished by marking the resource as SUSPENDED. In one embodiment, when the resource owner suspends any version of the resource, all versions of the resource will be rendered as SUSPENDED. In another embodiment, when the resource owner suspends a version of the resource, only that particular version of the resource will be rendered as SUSPENDED. In yet another embodiment, when the resource owner suspends a version of the resource, all versions prior to the suspended version will be rendered as SUSPENDED.

At block 520, a resource pool related to the suspended resource is deactivated, e.g., by resource broker 120 of FIG. 1. In some embodiments, while the formation of a resource pool requires reaching consensus among all participants, the deactivation of a resource pool is a unilateral action. At any given point in time, a single user is able to suspend the resources contributed by the user to the resource pool, thus deactivating the resource pool. Once the resource pool is deactivated, all resources in the resource pool are marked as SUSPENDED, in some embodiments.

In one embodiment, when a resource transitions to the SUSPENDED state, resource broker 120 will mark all resource pools that include any version of that resource as INACTIVE. In other words, all active resource pools associated with the resource will be rendered as INACTIVE. Further, the downstream workflows associated with the affected resource pools will be disabled. However, in some embodiments, only active resource pools associated with the particular suspended version of the resource will be rendered as INACTIVE. As such, users have more precision to control shared resources.

At block 530, the user republishes the resource, e.g., enabled by resource broker 120 of FIG. 1. In various embodiments, the resource owner makes the desired changes and republishes the resource, e.g., by marking the state of the resource as PUBLISHED again. Subsequently, resource broker 120 notifies all affected users, so that they have the opportunity to republish their resources, e.g., after making some changes of their own resources accordingly, thus triggering the creation of a new resource pool based on the latest published versions of the resources.

At block 540, a new resource pool is formed when all required resources are republished, e.g., enabled by resource broker 120 of FIG. 1. Resource broker 120 notifies all the participants of any newly published resources in the deactivated resource pool, and suggests an optional upgrade opportunity. If the users of the deactivated resource pool again reach a consensus based on the republished resources, a new resource pool will be formed, and further new workflows for resource sharing will be activated as well.

Figure 6:
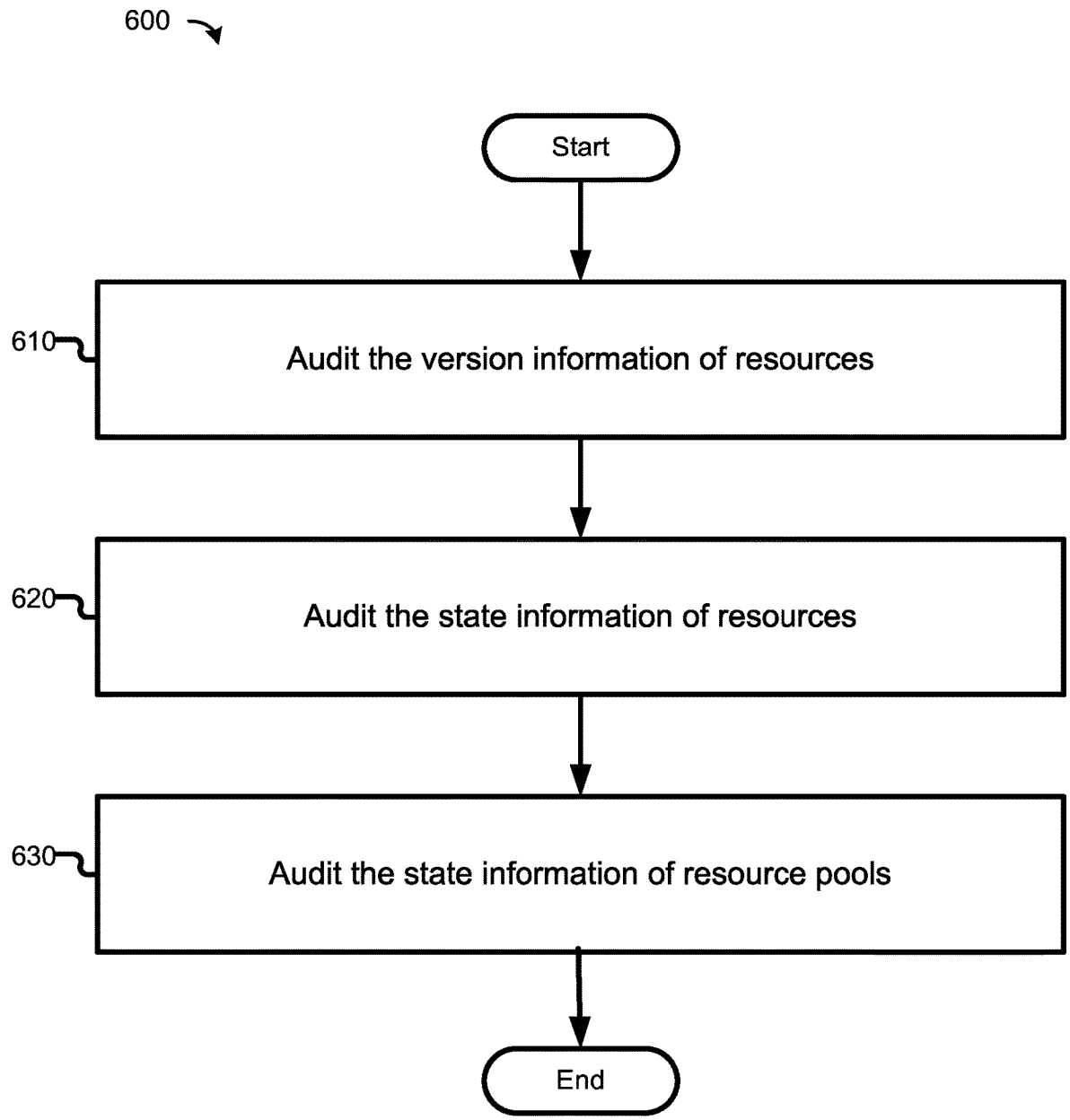
FIG. 6 is a flow diagram of an example process for auditing, incorporating aspects of the present disclosure, in accordance with various embodiments.

FIG. 6 is a flow diagram of an example process 600 for auditing, which is to be practiced by an example resource management system in accordance with various embodiments, is provided. As shown, process 600 is to be performed by, e.g., resource auditor 110 of FIG. 1 to implement one or more embodiments of the present disclosure. Similar to process 500, in various embodiments, process 600 may have fewer or additional operations, or perform some of the operations in different orders.

Resource management system 100 has built-in audit capabilities. Such audit capabilities can be partially accomplished by lacking of support for either the DELETE or the UPDATE operations for any of the resources managed by resource management system 100. In some embodiments, resources and resource pools are implemented with persistent data structures. All modifications applied on a resource imply the creation of a new version of that resource, e.g., with a higher version number. The same applies for the management of resource pools. Once a resource pool is formed, it will not be deleted or modified, but can only be marked as INACTIVE. Therefore, resource management system 100 can provide a complete history of operations applied on the resources managed by the system together with the full attribution info, e.g., who did what and when.

At block 610, resource auditor 110 audits the version information of resources. By way of example, resource auditor 110 tracks the version numbers of a resource, the set of artifacts included in each version of the resource, the configuration information of each version, and any metadata associated with each version of the resource, such as when and who made the changes to the resource.

At block 620, resource auditor 110 audits the state information of resources. In connection with FIG. 3, a resource has at least three states in its life cycle, such as DRAFT, PUBLISHED, and SUSPENDED. In one embodiment, resource auditor 110 treats a resource as a whole; therefore, the resource would only have one state at any given time. However, in some embodiments, resource auditor 110 treats each version of the resource independently. Therefore, each version of the resource is tracked for its own state.

At block 630, resource auditor 110 audits the state information of resource pools. In some embodiments, the life cycle of a resource pool is not as cyclic as the life cycle of a resource. Rather, a resource pool starts with a state of ACTIVE, then once the state changes to INACTIVE, the resource pool will remain in that INACTIVE state. The state information of resource pools is useful in managing downstream workflows for resource sharing, e.g., only ACTIVE resource pools should be associated with any workflows for resource sharing. The state information of resource pools also becomes useful after a resource is suspended since only ACTIVE resource pools need to be checked for any impact of the suspended resource.

Figure 7:
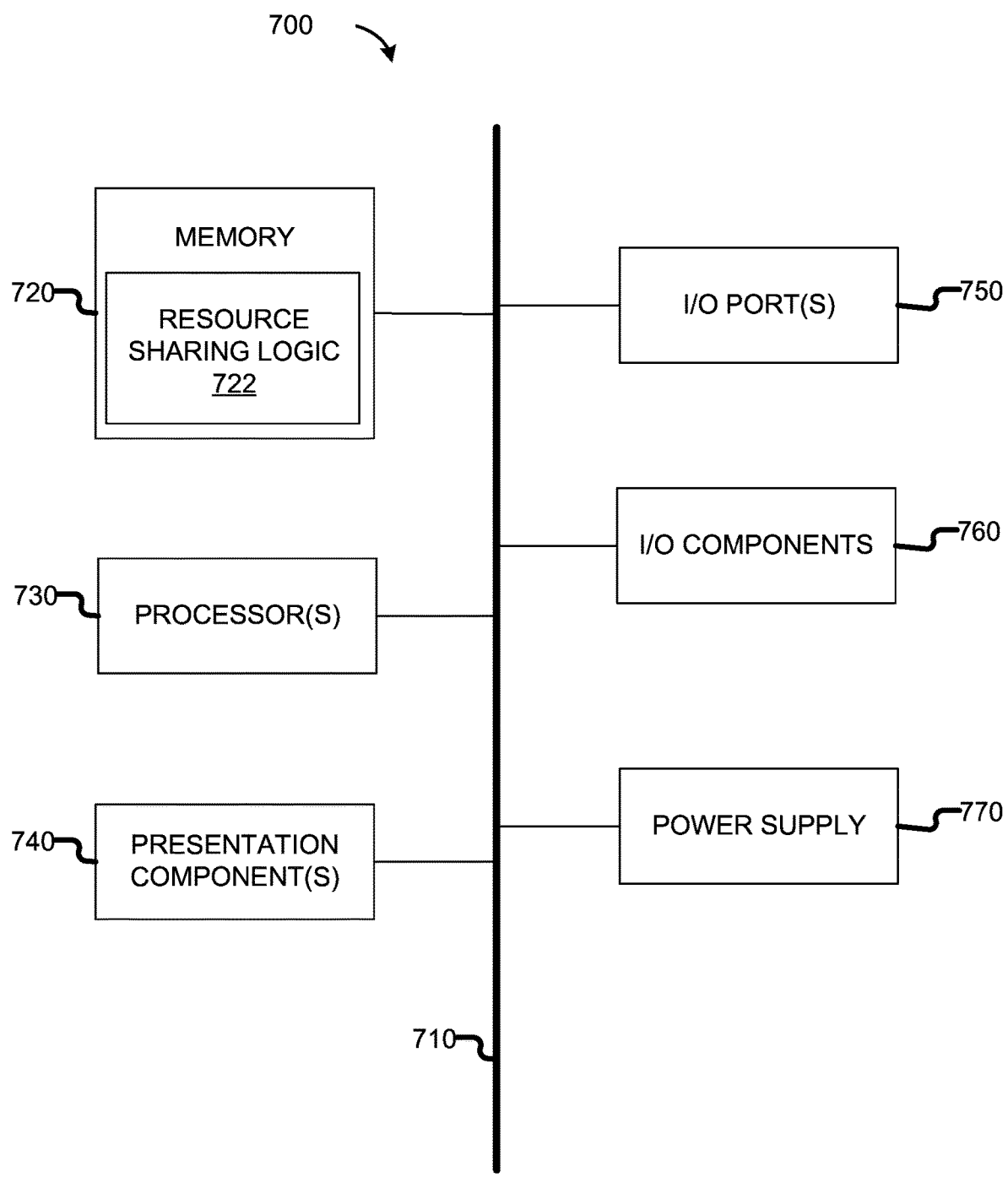
FIG. 7 illustrates an example computing device suitable for practicing the disclosed embodiments, in accordance with various embodiments.

Having briefly described an overview of embodiments of the present invention, an exemplary operating environment in which embodiments of the present invention is to be implemented is described below in order to provide a general context for various aspects of the present invention. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The disclosure is described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The embodiments of this disclosure are to be practiced in a variety of system configurations, including handheld devices, consumer electronics, general-purpose computers, more specialty computing devices, etc. The embodiments of this disclosure are to be practiced in distributed computing environments where tasks are performed by remote-processing devices that are linked through a communications network.

With reference to FIG. 7, computing device 700 includes a bus 710 that directly or indirectly couples the following devices: memory 720, one or more processors 730, one or more presentation components 740, input/output (I/O) ports 750, input/output (I/O) components 760, and an illustrative power supply 770. Bus 710 represents one or more busses (such as an address bus, data bus, or combination thereof). Although the various blocks of FIG. 7 are shown with lines for the sake of clarity, in reality, delineating various components is not so clear, and metaphorically, the lines would more accurately be fuzzy. For example, a presentation component such as a display device could also be considered as an I/O component. Also, processors have memory. The inventor recognizes that such is the nature of the art, and reiterates that the diagram of FIG. 7 is merely illustrative of an exemplary computing device that is used in connection with one or more embodiments of the present invention. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media include any available media to be accessed by computing device 700, and include both volatile and nonvolatile media, and removable and non-removable media. By way of example, and not limitation, computer-readable media comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which is used to store the desired information and which is accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 720 includes computer storage media in the form of volatile and/or nonvolatile memory. In various embodiments, the memory is removable, non-removable, or a combination thereof. Exemplary hardware devices include solid-state memory, hard drives, optical-disc drives, etc. Computing device 700 includes one or more processors that read data from various entities such as memory 720 or I/O components 760. Presentation component(s) 740 present data indications to a user or other device. Exemplary presentation components include a display device, speaker, printing component, vibrating component, etc.

In various embodiments, memory 720 includes, in particular, temporal and persistent copies of resource sharing logic 722. Resource sharing logic 722 includes instructions that, when executed by one or more processors 730, result in computing device 700 to manage shared resources, such as, but not limited to, process 400, process 500, or process 600.

In various embodiments, resource sharing logic 722 includes instructions that, when executed by processors 730, result in computing device 700 performing various functions associated with, but not limited to, resource auditor 110, resource broker 120, resource distributor 130, or resource pools 140, in connection with FIG. 1.

In some embodiments, one or more processors 730 are to be packaged together with resource sharing logic 722. In some embodiments, one or more processors 730 are to be packaged together with resource sharing logic 722 to form a System in Package (SiP). In some embodiments, one or more processors 730 are integrated on the same die with resource sharing logic 722. In some embodiments, processors 730 are integrated on the same die with resource sharing logic 722 to form a System on Chip (SoC).

I/O ports 750 allow computing device 700 to be logically coupled to other devices including I/O components 760, some of which are built-in components. Illustrative components include a microphone, joystick, game pad, satellite dish, scanner, printer, wireless device, etc. In some embodiments, the I/O components 760 also provide a natural user interface (NUI) that processes air gestures, voice, or other physiological inputs generated by a user. In some embodiments, inputs are to be transmitted to an appropriate network element for further processing. An NUI implements any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 is equipped with depth cameras, such as stereoscopic camera systems, infrared camera systems, RGB camera systems, touchscreen technology, and combinations of these, for gesture detection and recognition. Additionally, the computing device 700 is equipped with accelerometers or gyroscopes that enable detection of motion. The output of the accelerometers or gyroscopes is to be provided to the display of the computing device 700 to render immersive augmented reality or virtual reality.

Although certain embodiments have been illustrated and described herein for purposes of description, a wide variety of alternate and/or equivalent embodiments or implementations calculated to achieve the same purposes could be substituted for the embodiments shown and described without departing from the scope of the present disclosure. This application is intended to cover any adaptations or variations of the embodiments discussed herein. Therefore, it is manifestly intended that embodiments described herein be limited only by the claims.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. One or more computer storage media comprising computer-implemented instructions that, when used by one or more computing devices, cause the one or more computing devices to:
   form a resource pool comprising a plurality of resources contributed by a plurality of users participating in the resource pool, wherein each respective resource of the plurality of resources comprises a published state and a suspended state;

enable each respective user of the plurality of users participating in the resource pool to set each resource contributed to the resource pool by the respective user to either the published state or the suspended state;

determine whether each of a plurality of resources in the resource pool that are required by the resource pool reached the published state; and in response to each of the plurality of resources in the resource pool that are required by the resource pool reaching the published state, activate the resource pool with a data distribution specification for the resource pool to distribute respective versions of the plurality of resources in the resource pool.

2. The one or more computer storage media of claim 1, wherein the instructions further cause the one or more computing devices to:

enable a first user of the plurality of users to create a draft version of a resource of the plurality of resources; and enable a second user of the plurality of users to view the draft version of the resource and provide feedback to the first user regarding the draft version of the resource.

3. The one or more computer storage media of claim 1, wherein the instructions further cause the one or more computing devices to:

audit version information and state information of the plurality of resources.

4. The one or more computer storage media of claim 1, wherein the instructions further cause the one or more computing devices to:

receive a signal from a user of the plurality of users to set a resource of the plurality of resources to the suspended state; and based on the signal, deactivate the resource pool and disable a workflow conforming to the data distribution specification for distributing the resource of the plurality of resources.

5. The one or more computer storage media of claim 4, wherein the instructions further cause the one or more computing devices to:

enable the user of the plurality of users to publish a new version of the resource; and notify other users of the plurality of users of the new version of the resource.

6. The one or more computer storage media of claim 5, wherein the instructions further cause the one or more computing devices to:

enable the other users of the plurality of users to publish their respective resources into a new resource pool of shared resources; and form a new data distribution specification to distribute the resources published to the new resource pool.

7. The one or more computer storage media of claim 1, wherein the instructions further cause the one or more computing devices to:

enable a user of the plurality of users to publish distinct versions of a resource to different resource pools of shared resources.

8. The one or more computer storage media of claim 7, wherein the plurality of resources comprises multimedia or analytics data, and the instructions further cause the one or more computing devices to:

route the multimedia or analytics data to appropriate destinations based on the data distribution specification.

9. The one or more computer storage media of claim 1, wherein the instructions further cause the one or more computing devices to:

in response to a user of the plurality of users changing a state of a resource of the plurality of resources to the published state, send an indication that the resource is available to be included in the resource pool.

10. A computer-implemented method, comprising:

enabling each respective user of a plurality of users participating in a first resource pool of shared resources to set each resource contributed to the first resource pool by the respective user to a published state or a suspended state;

deactivating the first resource pool of shared resources based on a first indication that a resource contributed by a user of the plurality of users has been set to the suspended state;

receiving a second indication of publication of another version of the resource by the user to a second resource pool, wherein the second resource pool comprises a plurality of shared resources, and wherein each of the plurality of shared resources comprises the published state and the suspended state;

notifying other users of the another version of the resource;

receiving a third indication that each of a plurality of resources required by the second resource pool reached the published state; and in response to each of the plurality of resources required by the second resource pool reaching the published state, activating the second resource pool with a workflow for the second resource pool to distribute respective versions of the plurality of resources in the second resource pool.

11. The method of claim 10, further comprising:

deactivating all resource pools of shared resources that include the resource contributed by the user.

12. The method of claim 11, further comprising:

enabling the user to create a draft version of the resource; and enabling another user to view the draft version of the resource and provide feedback to the user regarding the draft version of the resource.

13. The method of claim 10, further comprising:

auditing version information and state information of the plurality of resources.

14. The method of claim 13, wherein the state information comprises at least one of a draft state, the published state, or the suspended state.

15. The method of claim 10, further comprising:

auditing state information of the first resource pool, wherein the state information of the first resource pool comprises one state of active or inactive.

16. The method of claim 10, further comprising:

determining the workflow for the second resource pool based on one or more data stream specifications specified in the respective versions of the plurality of resources required by the second resource pool.

17. The method of claim 10, wherein the second indication is indicative of the user changing the state of the resource to the published state, and wherein the second indication is indicative of the resource being available to be included in the resource pool.

18. A system, comprising:

one or more processors; and one or more computer storage media storing computer-usable instructions that, when executed by the one or more processors, cause the one or more processors to perform operations comprising:

auditing version information and state information of a plurality of resources contributed by a plurality of users, wherein each of the plurality of resources comprises a published state and a suspended state;

facilitating a formation of a resource pool of shared resources in response to resources required by the resource pool reaching a published state; and forming a workflow to distribute respective versions of the resources in the resource pool.

19. The system of claim 18, wherein the operations further comprise enabling a user to publish distinct versions of a resource to different resource pools of shared resources.

20. The system of claim 18, wherein the operations further comprise deactivating all resource pools of shared resources that include a resource contributed by a user when the user sets the resource to the suspended state.

* * * * *